United States Patent [19]

Yousef et al.

[11] Patent Number: 5,056,611
[45] Date of Patent: Oct. 15, 1991

[54] SCREW THREAD STRUCTURE

[75] Inventors: Faisal J. Yousef; Robert F. Kane, both of Houston; Joel Ham, Cypress; David Mildren, Houston, all of Tex.

[73] Assignee: Galloway Trust, Neenah, Wis.

[21] Appl. No.: 529,575

[22] Filed: May 29, 1990

[51] Int. Cl.⁵ .................... E21B 10/36; F16B 35/04
[52] U.S. Cl. .................................. 175/415; 411/414; 411/366; 285/334
[58] Field of Search ............... 411/311, 392, 411-416, 411/423, 366; 285/334, 390; 403/307; 175/414, 415, 320

[56] References Cited

U.S. PATENT DOCUMENTS

| | | | |
|---|---|---|---|
| 4,295,751 | 10/1981 | Holmberg | 411/411 |
| 4,527,932 | 7/1985 | Onasch et al. | 411/411 |
| 4,799,844 | 1/1989 | Chuang | 411/414 |
| 4,861,210 | 8/1989 | Frerejacques | 411/411 |
| 4,907,926 | 3/1990 | Wing | 411/414 |

Primary Examiner—Neill R. Wilson
Attorney, Agent, or Firm—Thomas D. Wilhelm

[57] ABSTRACT

A screw thread structure includes a root portion, the shape of which is defined by portions of two axially overlapping ellipses interconnected by a flat.

10 Claims, 3 Drawing Sheets

SCREW THREAD STRUCTURE

BACKGROUND OF THE INVENTION

This invention relates generally to a screw thread structure and in particular to an improvement of a screw thread structure disclosed in U.S. Pat. No. 4,799,844.

In the art of percussion drilling, such as for mining, quarrying water well drilling, and the like, various components of a percussion drilling tool are frequently coupled together by threaded screw structures. In these coupled drilling components, the thread design is of considerable importance since failure often occurs in the screw structure. Whenever failure in the screw structure does occur, the initial crack usually initiates at the thread root. This is due to the high stress concentrations located at the root of the thread when the screw structure is subject to severe loading.

Traditionally, the root portion has been configured as a portion of a circle, tangentially adjoining the two flanks of successive thread turns. Generally speaking, the stress concentration along the thread root is an inverse function of the radius of that circle, i.e., the larger the radius of the circle, the lower the stress concentration. However, when the size of the radius surpasses a maximum allowable value, the stress concentrations at the ends of the root, where the flanks of the adjacent thread turns tangentially adjoin the root, become very high and thus provide starting points for crack propagation. Alteratively, when the size of the radius defining the circular root curvature decreases below a minimum allowable value, the stress concentration becomes very high at the bottom of the root. Thus, circular root curvatures are confined to radii sizes falling between certain maximum and minimum limits, depending on such factors as thread pitch and the like.

An improved screw structure has been disclosed in U.S. Pat. No. 4,799,844 wherein the screw structure of each of the threadedly interconnected drilling components includes a root portion configured as a portion of an ellipse. That elliptical root curvature provides a larger equivalent radius at the thread root which results in a decreased stress concentration along the root. Notwithstanding the benefits attainable by that screw structure, room for improvement remains, especially insofar as further relieving stress concentrations along the root.

BRIEF SUMMARY OF THE INVENTION

The present invention involves a screw structure comprising at least one thread extending helically in spaced thread turns about a longitudinal axis. The thread includes a load bearing flank, a non-load bearing flank, and a crest portion extending between the load bearing flank and the nonload bearing flank. A root extends between adjacent thread turns. The root, as viewed in longitudinal section, has a curvature defined by portions of two axially overlapping ellipses interconnected by a flat. The ellipses tangentially adjoin respective ones of the load bearing flank and non-load bearing flank. The flat is oriented parallel to the axis and tangentially adjoins the ellipses.

BRIEF DESCRIPTION OF THE DRAWING

The objects and advantages of the invention will become apparent from the following detailed description of preferred embodiments thereof in connection with the accompanying drawings in which like numerals designate like elements, and in which.

DETAILED DESCRIPTION OF A PREFERRED EMBODIMENT OF THE INVENTION

Figure 1:
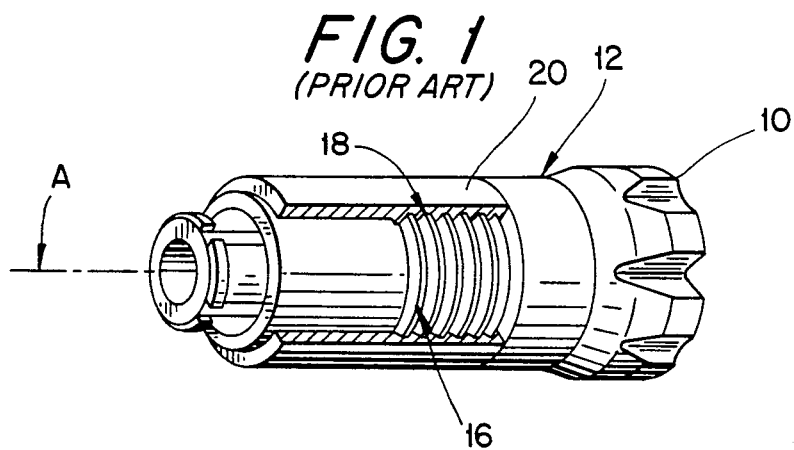
FIG. 1 is a perspective view, partially broken away, of the front end of a conventional down hole percussion drill.
Figure 2:
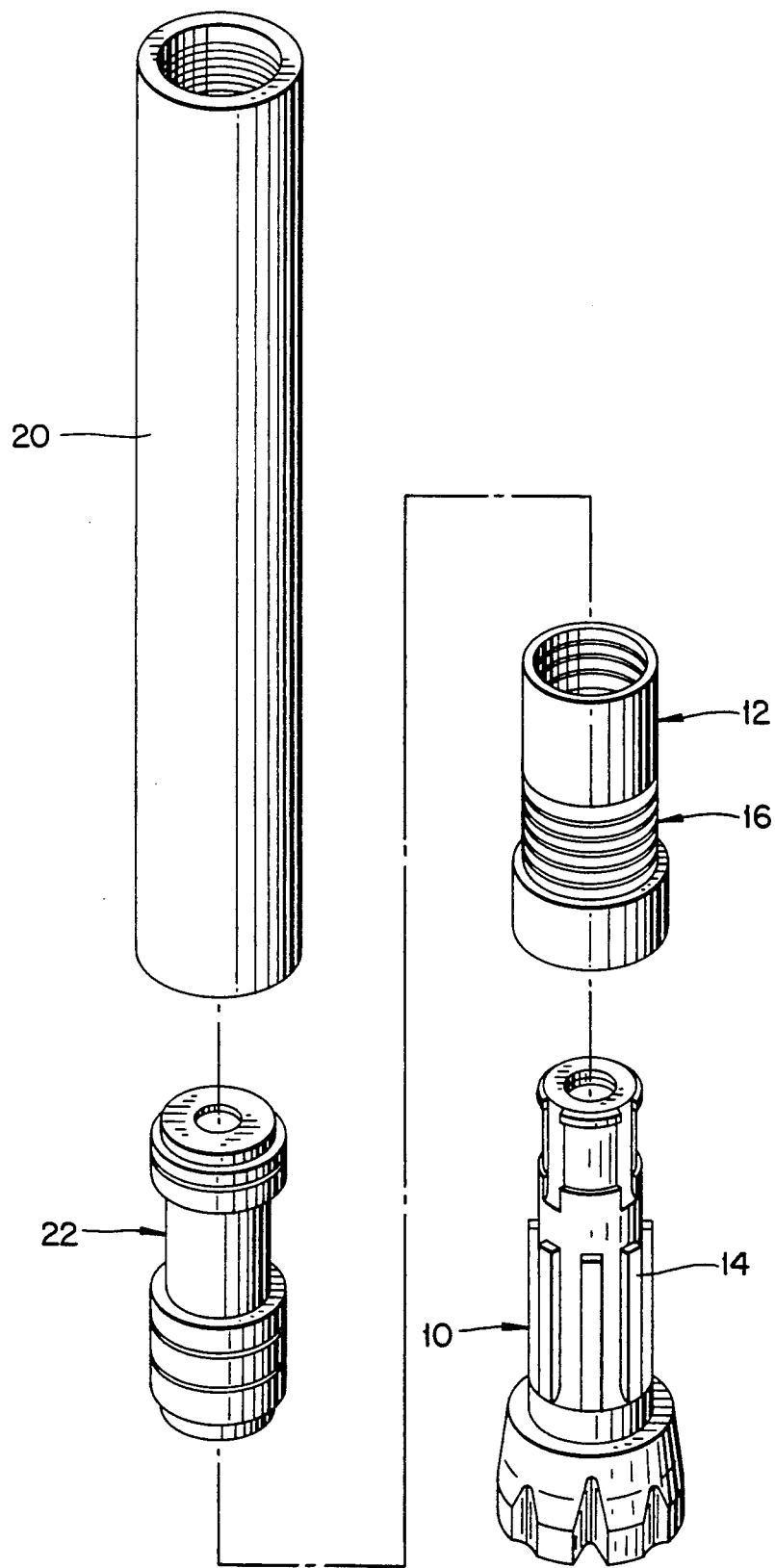
FIG. 2 is an exploded perspective view of the conventional components forming the front end of the percussion drill.

Depicted in FIGS. 1 and 2 is a conventional down hole percussion drill which includes a drill bit 10 mounted at the front end of a drill string. The drill string includes a threaded element in the form of a driver sub 12 which slides over a rear end of the drill bit and which is connected to the drill bit 10 by a spline connection, i.e., by external splines 14 on the drill bit and internal splines (not shown) on the driver sub 12. The drill bit 10 is thus constrained to rotate with the driver sub 12 but is capable of limited axial movement relative thereto.

The driver sub 12 includes an external or male screw thread 16 which is connected by a screw thread to an internal or female screw thread 18 of a mating member in the form of a cylindrical case 20. Slidably disposed within the case 20 is a piston 22 which is axially reciprocated by a conventional mechanism in order to apply percussive forces to the rear end of the drill bit to enhance the penetration rate of the drill bit. An upper end of the case 20 is threadedly connected to a top sub (not shown), and the latter is threadedly connected to another component of the drill string, and so on.

Figure 3:
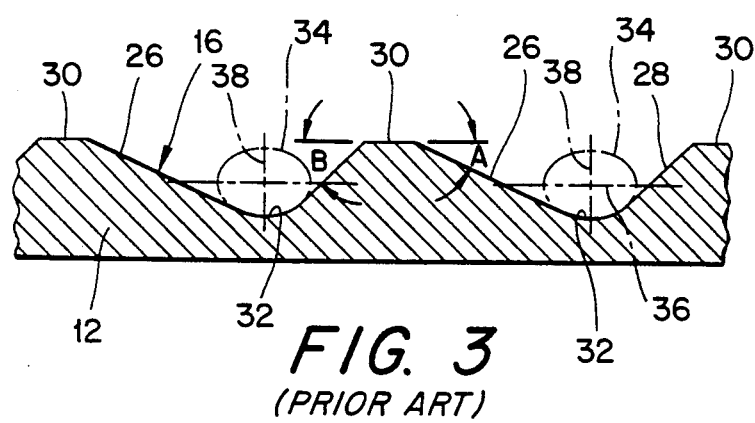
FIG. 3 is a longitudinal sectional view taken through a portion of a conventional screw thread structure.

A prior art thread construction in accordance with U.S. Pat. No. 4,799,844 is depicted in FIG. 3. Each of the male and female threads 16, 18 is of identical construction and thus only the male thread 16 of the driver sub 12 is depicted in FIG. 3. That conventional thread 16 includes a non-load bearing flank surface 26, a load bearing flank surface 28, and a crest portion 30 extending between the load bearing and non-load bearing flanks. When the drill string is subject to loading, the forces will be transmitted between coupled male and female screw structures via contiguous mating load bearing flanks of the respective male or female threads. The crest 30 is flat and extends axially. In other words, the crest portion 30 extends between thread flanks 26, 28 straight and parallel to the longitudinal axis of the driver sub 12.

A root 32 extends between adjacent thread turns. The root portion has a curvature defined by a portion of an ellipse, shown in phantom at 34. The ellipse has a major axis 36 and a shorter and perpendicular minor axis 38. The major axis extends axially, i.e., parallel to the longitudinal axis of the driver sub 12 and the minor axis of the ellipse extends radially, i.e., perpendicularly to the longitudinal axis. Because of the extreme loads applied to screw structures in the percussion drilling environment, the non-load bearing flank 26 of the thread has a greater surface area than the load bearing flank 28. That is, the thread profile resembles a typical reverse buttress thread profile. Alteratively, the thread could be shaped as a buttress thread wherein the load bearing flank 28 has a greater surface area than the non-load bearing flank 26.

While a single thread lead is depicted in the figures, the screw structure could instead comprise a multiple thread lead.

The load bearing and non-load bearing flanks extend tangentially from the ellipse 34 at the root 32 straight to the crest portions 30. Preferably, the non-load bearing flank 26 has an angular slope A extending axially away from the crest portion at approximately 30°, and the load bearing flank 28 has an angular slope B extending axially away from the crest portion at approximately 60°, although other suitable angles could be provided. Accordingly, the angle formed between the flanks 26 and 28 (and corresponding to angle C shown in FIG. 4) is approximately 90°.

The elliptical root 34 presents a larger equivalent radius than a circular root and thus provides a greater relief in stress concentration at the root. Also, the elliptical root is stronger than a circular root structure because of the greater wall thickness which remains after the elliptical root is formed. Furthermore, the elliptical root configuration allows for greater thread-to-thread contact between abutting load bearing flanks. These advantages are explained in greater detail in U.S. Pat. No. 4,799,844, the disclosure of which is incorporated by reference herein.

Figure 4:
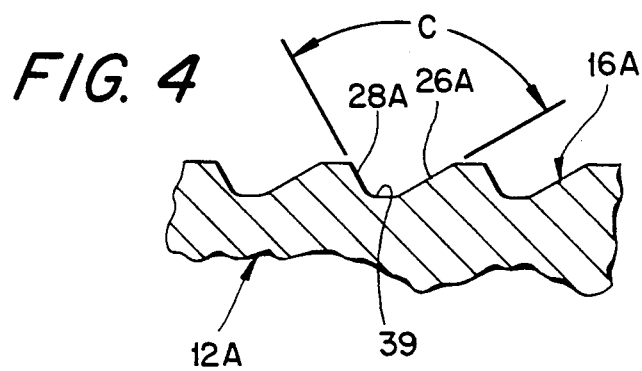
FIG. 4 is a view similar to FIG. 3 of a screw thread structure according to the present invention.
Figure 5:
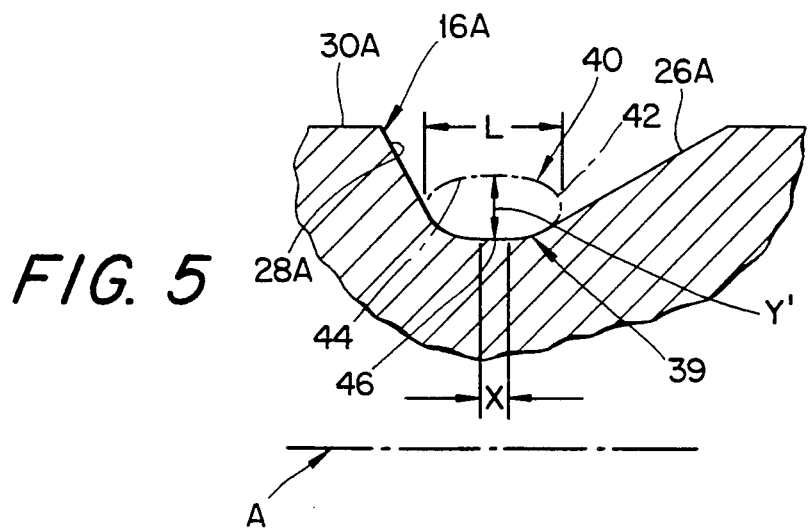
FIG. 5 is an enlarged fragmentary longitudinal sectional view taken through a screw thread structure according to the present invention.
Figure 7:
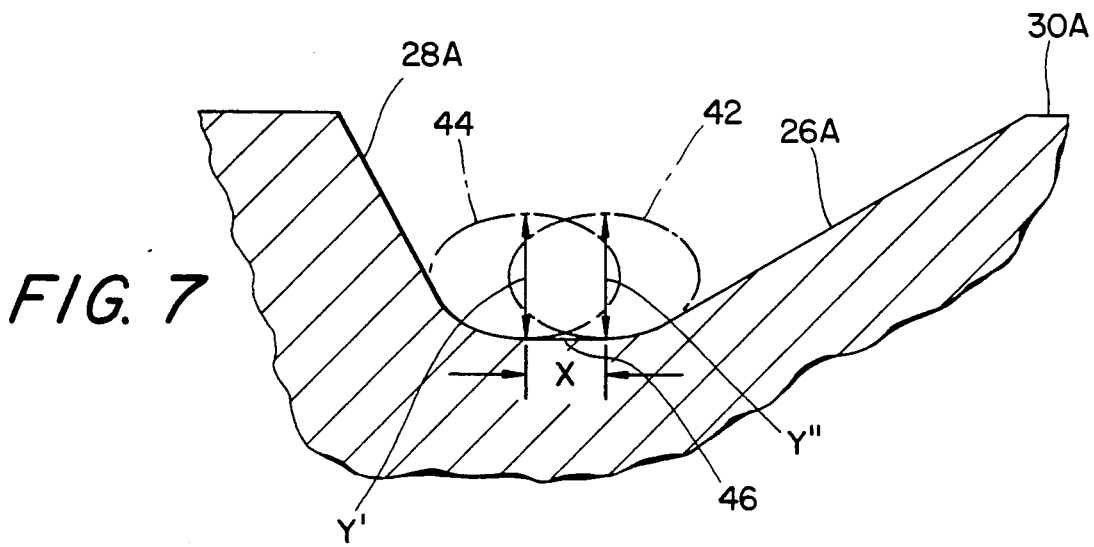
FIG. 7 is an enlarged view of FIG. 5.

In accordance with the present invention, a still greater relief in stress concentration at the root is provided. This is accomplished by a novel root configuration, a preferred embodiment of which is depicted in FIGS. 4, 5 and 7. The items depicted in those figures are given the same reference numerals as corresponding elements in FIG. 3 together with the suffix "A". In sum, it will be appreciated that the thread 16A depicted in FIGS. 4, 5 and 7 is a reverse buttress type thread of the same general nature as described in connection with FIG. 3. That is, the thread has load bearing and non-load bearing flanks 26A, 28A interconnected by flat crest portions 30A, and a root 39 which tangentially joins those flanks. As will become evident, however, the present invention is also applicable to other thread configurations, including buttress threads.

In FIGS. 4, 5 and 7, however, the root 39 is not of continuously curved configuration as is the case with the root depicted in FIG. 3. Rather, the root 39 is, in accordance with the present invention, defined by a configuration 40 comprised of end portions of two identical ellipses 42, 44 and a flat 46 which tangentially joins those ellipse end portions, as viewed in longitudinal section through the thread.

Figure 6:
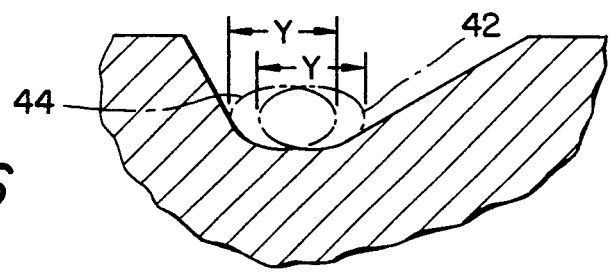
FIG. 6 is a view similar to FIG. 5 before the flat has been formed in the root of the screw thread structure.

The two ellipses are depicted in FIG. 6 which represents the root 39 before the flat is formed. Those two ellipses 42, 44 overlap axially, i.e., they overlap in a direction parallel to the longitudinal axis A. The ellipses 42, 44 have major axes of identical lengths Y, and minor axes of identical length Y'. The ellipses 42, 44 tangentially adjoin respective ones of the flanks 26 and 28 as best shown in FIG. 7.

The flat 46 is oriented parallel to the axis A of the thread and parallel to major axes of the ellipses. The flat 46 tangentially adjoins the ellipses 42, 44.

The flat is shown as having a length X. The total length L of the root configuration equals on-half the length y of both major axes plus the length X of the flat, i.e., $Y/2 + Y/2 + X$; or $Y + X$.

This configuration of the root 16A having the flat 46 has been found to minimize the stress concentration at the root. The resulting stress concentration is less than that which would occur in the case of a single ellipse having a major axis equal to the length L. Moreover, the case of such a single ellipse there would be less wall thickness to support the thread (since the flat 46 would be replaced by a curved segment).

As a result of the reduced stress concentration occurring at the root, the thread is less susceptible to stress fractures and thus exhibits a greater life span. That greater life span translates into less frequent replacement of the drill string components and the accompanying work stoppages.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A percussion drill comprising a piston case and a drive sub connected to a lower end of said piston case by a thread coupling, said thread coupling comprising first and second screw structures on said piston case and driver sub, respectively, said first screw structure comprising at least one first thread extending helically in spaced thread turns about a longitudinal axis, said first thread including a first load bearing flank, a first non-load bearing flank and a first crest portion extending between said load bearing flank and said non-load bearing flank, a first root extending between adjacent turns of said first thread, said first root as viewed in longitudinal section having a first curvature defined by portions of two axially overlapping ellipses interconnected by a flat, said ellipses tangentially adjoining respective ones of said first load bearing flank and said first non-load bearing flank, said flat oriented parallel to said axis and tangentially adjoining said ellipses, said second screw structure comprising at least one second thread extending helically in spaced thread turns about said longitudinal axis, said second thread including a second load bearing flank, a second non-load bearing flank, a second crest portion extending between said first load bearing flank and said first non-load bearing flank, and a second root extending between adjacent turns of said second thread, said second root as viewed in longitudinal section having a second curvature defined by portions of two axially overlapping ellipses interconnected by a flat, said ellipses of said second curvature tangentially adjoining respective ones of said second load bearing flank and said second nonload bearing flank, said flat of said second thread oriented parallel to said axis and tangentially adjoining said ellipses of said second thread.

2. A screw structure according to claim 1, wherein said major axes of said ellipses are of equal length.

3. A screw structure according to claim 1, wherein said crest portions are flat and extend parallel to said axis.

4. A screw structure according to claim 1, wherein said load bearing flank has a greater surface area than said non-load bearing flank.

5. A screw structure according to claim 1, wherein said non-load bearing flank has a greater surface area than said load bearing flank.

6. A screw structure according to claim 1, wherein minor axes of said ellipses are shorter than a radial distance between said crest portion and said root.

7. A screw structure according to claim 1, wherein said thread comprises a single lead.

8. A screw structure according to claim 1, wherein said thread comprises a multiple lead.

9. A percussion drill according to claim 1, wherein said load bearing and non-load bearing flanks form therebetween an angle of approximately ninety degrees.

10. A percussion drill according to claim 9, wherein each of said load bearing flanks has an angular slope extending away from its respective crest portion of approximately thirty degrees, and each of said non-load bearing flanks has an angular slope away from its respective crest portion of approximately sixty degrees.

* * * * *

UNITED STATES PATENT AND TRADEMARK OFFICE
CERTIFICATE OF CORRECTION

PATENT NO. : 5,056,611

DATED : October 15, 1991

INVENTOR(S) : Faisal J. YOUSEF et al

It is certified that error appears in the above-identified patent and that said Letters Patent is hereby corrected as shown below:

Title page:
  Assignee: please delete "Galloway Trust, Neenah, Wis." and insert therefor --Sandvik Rock Tools, Inc., Bristol, Virginia Attorney, Agent or Firm: please delete "Thomas D. Wilhelm" and insert therefor --Burns, Doane, Swecker & Mathis--.

Signed and Sealed this

Fourth Day of May, 1993

*Attest:*

MICHAEL K. KIRK

*Attesting Officer*    Acting Commissioner of Patents and Trademarks